US012688725B2

(12) United States Patent
Schaefer et al.

(10) Patent No.: US 12,688,725 B2
(45) Date of Patent: *Jul. 21, 2026

(54) MACHINE LEARNING-BASED DIAGRAM LABEL RECOGNITION

(71) Applicant: SAP SE, Walldorf (DE)

(72) Inventors: Bernhard Schaefer, Worms (DE);
Andreas Gerber, Königsbach (DE)

(73) Assignee: SAP SE, Walldorf (DE)

( * ) Notice: Subject to any disclaimer, the term of this patent is extended or adjusted under 35 U.S.C. 154(b) by 387 days.

This patent is subject to a terminal disclaimer.

(21) Appl. No.: 18/079,213

(22) Filed: Dec. 12, 2022

(65) Prior Publication Data

US 2024/0193976 A1 Jun. 13, 2024

(51) Int. Cl.
| | |
|---|---|
| *G06V 30/262* | (2022.01) |
| *G06Q 10/067* | (2023.01) |
| *G06T 7/60* | (2017.01) |
| *G06V 30/14* | (2022.01) |
| *G06V 30/19* | (2022.01) |
| *G06V 30/22* | (2022.01) |

(52) U.S. Cl.
CPC ......... *G06V 30/262* (2022.01); *G06Q 10/067* (2013.01); *G06T 7/60* (2013.01); *G06V 30/1444* (2022.01); *G06V 30/19* (2022.01); *G06V 30/22* (2022.01)

(58) Field of Classification Search
CPC ...... G06F 16/35; G06F 40/279; G06F 40/103; G06F 40/18; G06F 40/30; G06F 18/214; G06F 18/2415; G06F 40/166; G06F 40/169; G06F 40/284; G06F 40/58; G06F 16/22; G06F 16/2458; G06F 16/25; G06F 16/31; G06F 16/901; G06F 16/93; G06F 17/00; G06F 40/295; G06N 3/08; G06N 20/00; G06N 5/02; G06N 99/00; G06V 30/19; G06V 30/14; G06V 30/413; G06V 30/414; G06V 10/82; G06V 30/22; G06V 30/262; G06V 30/422; G06Q 10/067; G06T 7/60; G06T 9/00
USPC .......................................................... 382/113
See application file for complete search history.

(56) References Cited

U.S. PATENT DOCUMENTS

| | | | |
|---|---|---|---|
| 7,555,711 B2 * | 6/2009 | Chao ...................... | G06F 40/103 |
| | | | 715/246 |
| 8,233,671 B2 * | 7/2012 | Anderson ............ | G09B 21/008 |
| | | | 382/114 |
| 12,124,424 B1 * | 10/2024 | Brons .................... | G06Q 10/10 |

(Continued)

OTHER PUBLICATIONS

"Handwriting Recognition: Definition, Techniques & Uses" by Pragati Baheti writing for v7labs, Dec. 2, 2022 at https://www.v7labs.com/blog/handwriting-recognition-guide (Year: 2022).*

*Primary Examiner* — David Orange
(74) *Attorney, Agent, or Firm* — Fountainhead Law Group, PC

(57) ABSTRACT

Mechanisms are disclosed for machine learning-based diagram label recognition in connection with diagrams represented by unstructured images. An unstructured image of the diagram is received. A plurality of text blocks associated with the diagram is detected. The text blocks are associated with labels contained within the diagram. Textual contents of the text blocks and the labels are recognized. The labels are associated with corresponding edges and shapes within the diagram.

3 Claims, 6 Drawing Sheets

400

402
RECEIVE UNSTRUCURED IMAGE OF A DIAGRAM

404
DETECT OBJECTS ASSOCIATED WITH THE DIAGRAM

406
RECOGNIZE EDGES OF THE OBJECTS

408
RECOGNIZE TEXT OF LABELS WITHIN THE DIAGRAM

410
ASSOCIATE THE RECOGNIZED LABELS WITH OBJECTS

(56)                    References Cited

U.S. PATENT DOCUMENTS

| 2006/0204096 | A1* | 9/2006 | Takebe | G06V 30/414 |
| | | | | 382/176 |
| 2016/0358337 | A1* | 12/2016 | Dai | G06T 7/11 |
| 2020/0004765 | A1* | 1/2020 | Sørensen | G06F 18/214 |
| 2021/0073530 | A1* | 3/2021 | Schaefer | G06V 30/422 |
| 2021/0201018 | A1* | 7/2021 | Patel | G06F 18/22 |
| 2022/0036062 | A1* | 2/2022 | Yuan | G06V 30/274 |
| 2022/0097228 | A1* | 3/2022 | Schaefer | G06V 30/414 |
| 2022/0319216 | A1* | 10/2022 | Kolavennu | G06V 10/778 |
| 2024/0119751 | A1* | 4/2024 | Gardner | G06V 30/19147 |
| 2024/0143907 | A1* | 5/2024 | Ghosh | G06F 40/18 |

* cited by examiner

400

402

RECEIVE UNSTRUCURED IMAGE
OF A DIAGRAM

404

DETECT OBJECTS ASSOCIATED
WITH THE DIAGRAM

406

RECOGNIZE EDGES OF THE
OBJECTS

408

RECOGNIZE TEXT OF LABELS
WITHIN THE DIAGRAM

410

ASSOCIATE THE RECOGNIZED
LABELS WITH OBJECTS

MACHINE LEARNING-BASED DIAGRAM LABEL RECOGNITION

TECHNICAL FIELD

Embodiments generally relate to diagram label recognition, and more particularly to machine learning-based diagram label recognition in connection with diagrams represented by unstructured images.

Graphical modeling languages such as flowcharts, unified modeling language (UML), or business process model and notation (BPMN) are frequently used to describe concepts such as technical processes, algorithms, and/or software architectures. These diagrams include shapes, edges, and labels. Here, the shapes represent the so-called nodes of the diagram, each edge is defined by an arrow that connects two shapes, and each label is defined by a text block that relates to a diagram shape or edge.

Given an image that depicts a diagram, diagram recognition is concerned with automatically identifying diagram components and converting an unstructured image into a structured digital counterpart. The unstructured image may contain a hand-drawn diagram that has been sketched on whiteboard or paper, but it could also contain a computer-generated diagram. In an unstructured image such as a hand-drawn diagram, there may be some ambiguity regarding to which diagram shape or edge a label corresponds. Simply associating labels with drawing entities that are closest to a particular portion of a label may result in a label being associated with an improper entity. A user may manually associate all labels with their corresponding entities using, e.g., a BPMN editor, however such a process is time consuming and error prone. Accordingly, what is needed is an automated machine learning-based diagram label recognition in connection with diagrams represented by unstructured images that overcomes the above-described problems and challenges.

BRIEF DESCRIPTION OF THE DRAWING FIGURES

Embodiments are described in detail below with reference to the attached drawing figures, wherein.

Figure 1:
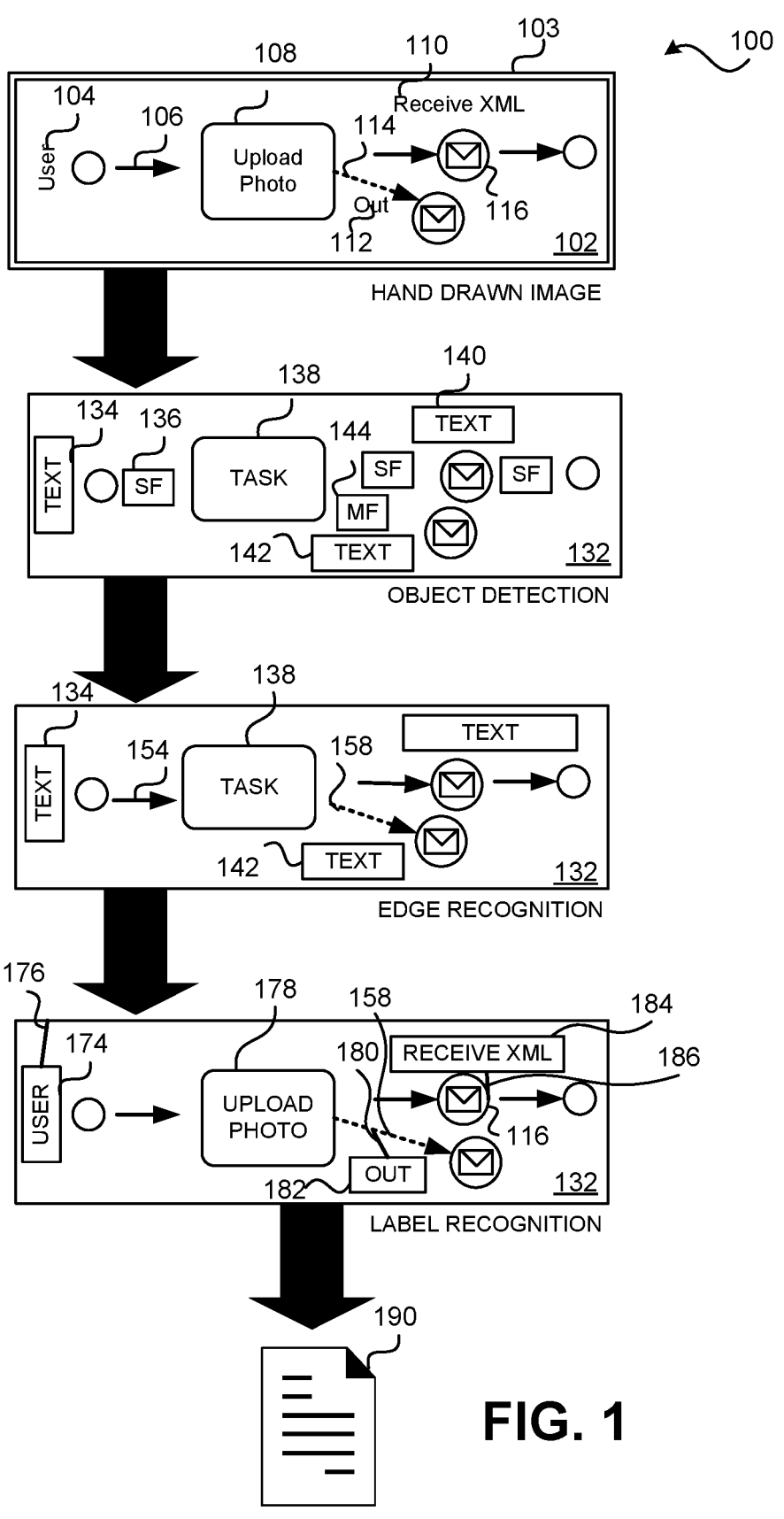
FIG. 1 is a system diagram illustrating a process of converting a hand-drawn diagram to a structured modeling format using machine learning-based diagram label recognition in connection with diagrams represented by unstructured images consistent with the present teachings.

The drawing figures do not limit the present teachings to the specific embodiments disclosed and described herein.

The drawings are not necessarily to scale, emphasis instead being placed upon clearly illustrating the principles of the disclosure.

DETAILED DESCRIPTION

The subject matter of the present disclosure is described in detail below to meet statutory requirements; however, the description itself is not intended to limit the scope of claims. Rather, the claimed subject matter might be embodied in other ways to include different steps or combinations of steps similar to the ones described in this document, in conjunction with other present or future technologies. Minor variations from the description below will be understood by one skilled in the art and are intended to be captured within the scope of the present claims. Terms should not be interpreted as implying any particular ordering of various steps described unless the order of individual steps is explicitly described.

The following detailed description of embodiments references the accompanying drawings that illustrate specific embodiments in which the present teachings can be practiced. The described embodiments are intended to illustrate aspects of the present teachings in sufficient detail to enable those skilled in the art to practice the present teachings. Other embodiments can be utilized, and changes can be made without departing from the claims. The following detailed description is, therefore, not to be taken in a limiting sense. The scope of embodiments is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate reference to "one embodiment" "an embodiment", or "embodiments" in this description do not necessarily refer to the same embodiment and are also not mutually exclusive unless so stated and/or except as will be readily apparent to those skilled in the art from the description. For example, a feature, structure, or act described in one embodiment may also be included in other embodiments but is not necessarily included. Thus, the technology can include a variety of combinations and/or integrations of the embodiments described herein.

Overview

The present teachings describe methods and systems to employ machine learning-based diagram label recognition in connection with diagrams represented by unstructured images consistent with the present teachings. Such techniques may be used in connection with images of hand-drawn diagrams drawn on paper or a white board, but they may also be electronic diagrams, such as a flowchart modeled in Microsoft PowerPoint. The target representation and file format depend on a target modeling language. For flowcharts, the diagram recognition component could generate a Microsoft Visio .vsdx file, and for business processes, BPMN .xml frequently used. Mechanisms consistent with the present teachings focus on recognizing labels within such diagrams. Label recognition may be carried out once shapes and edges of a particular diagram have been recognized.

In some embodiments, diagram recognition may be broken down into several steps, including several alternative embodiments for performing aspects of label recognition. A diagram label may be defined through several components. First, a so-called bounding box may denote the location of a label within an image. Next, each label has associated textual contents. Next, each label may be associated with a shape or edge to which it belongs. In connection with a hand-drawn BPMN diagram, labels may be emplaced near a shape or edge to which the label belongs, which is a way that diagram authors indicate the relation between a diagram shape or edge and a corresponding label. However, there are some notable differences between different types of shapes and edges. For so-called activity shapes, which may be modeled as rectangles, a label may be contained within the shape, which facilitates a determination regarding the shape to which such labels belong. However, there are various other shape types, such as events, which may be denoted with one or more circles, where corresponding labels are located in proximity to the shape. For edges, a label is typically in proximity to an associated arrow path.

Label detection may present a challenge where multiple shapes and edge candidates are in proximity. In some cases, multiple shapes and edges may be found in proximity to a label, which makes it difficult for an automated approach to identify a correct shape or edge (corresponding to the label). Mechanisms consistent with the present teachings employ machine learning models to text block relation candidates to accurately infer the correct shapes and edges that correspond to an identified label.

Operational Environment for Embodiments

FIG. 1 is a system diagram 100 illustrating a process of converting a hand-drawn diagram to a structured modeling format using machine learning-based diagram label recognition in connection with diagrams represented by unstructured images consistent with the present teachings. Hand-drawn diagram 103 shows an exemplary hand-drawn BPMN diagram with hand-drawn BPMN pool 102. As illustrated, diagram labels are commonly placed near a shape or edge to which they belong, indicating a relationship between the labels and the objects to which they refer. However, some notable differences exist between different types of shapes and edges. For the so-called activity shapes, which are modeled as rectangles, the corresponding activity label is contained within the shape, which makes it trivial to determine the shape that these labels belong to. However, there are various other shape types, such as the events denoted with one or multiple circles, where the labels are located somewhere in proximity to the shape. For edges, the label is typically somewhere close to the arrow path. In some cases, there may be multiple shapes and edges in proximity to a label, which makes it challenging for an automated approach to figure out the correct shape or edge.

Hand-drawn BPMN pool 102 contains various objects and associated labels. Within diagram 100, the hand-drawn objects contained within hand-drawn BPMN pool 102 are illustrated in connection with a machine rendered line drawing, but it is understood that each of the illustrated elements could be hand-drawn on a sheet of paper or a white board, etc. and converted into an unstructured image by way of a digital camera, etc. Hand-drawn text such as hand-drawn text block 104, containing textual content "User" could be hand-drawn in block text or other style of handwriting that may be recognized using any kind of optical character recognition technology. Similarly, while it is represented as a computer-rendered line drawing, the box depicted as hand-drawn box 108 may be a free hand sketch of a box drawn with or without the aid of a ruler. As depicted, textual contents of hand-drawn box 108 is "Upload Photo." Arrow 106 is directed towards hand-drawn box 108. Label 112 has handwritten textual content "Out" and it is meant to be associated with dashed arrow 114. Label 110 with textual content "Receive XML" is associated with object 116.

In a next processing step, object detection is depicted in connection with detected BPMN pool 132 and other objects associated with hand-drawn BPMN pool 102. As used herein, the term "text block" may refer to a piece of text in a diagram that has been identified through a so-called bounding box. In some embodiments, a bounding box is the smallest box that encloses an object of interest, for example a diagram label. As such, label recognition may be carried out as further described below. A challenge is to appropriately recognize which pieces of text in a diagram belong together, i.e., which form a single text block. This can be highly complex, since it may be hard to discern which words belong together, for instance because they are apart from each other in the drawing or even separated by (parts of) model shapes. In some embodiments, semantical context may be used to associate portions of text in a diagram with one another based on linguistic meaning. As noted above, hand-drawn box 108 contains textual content "Upload Photo" which are semantically related and detected to be associated with task box 138, which may be represented by a rectangular box with rounded corners.

Text block handwriting recognition aims to recognize the textual content that is contained within a text block, i.e., to interpret the handwritten text. Text blocks may be rotated, in front of complex backgrounds, and with overlapping model element strokes. Consistent with the present teachings, text block relation detection involves finding a shape or edge that the text block labels. Such text blocks may be close to multiple shape or edge candidates, making it difficult to distinguish the appropriate relation between a particular text block and model element. As part of the object detection depicted in connection with detected BPMN pool 132 and other objects associated with hand-drawn BPMN pool 102, text blocks contained in the associated unstructured image are detected. In some embodiments, text block detection may be carried out in connection with a deep learning object detector. To this end, a training set of annotated images may be compiled or otherwise obtained, such that associated bounding boxes corresponding to text blocks associated with a particular unstructured image are specified in connection with an annotation file. During the training process, a machine learning object detector may be provided with the training set and may be thereby trained to detect text blocks. After training, the object detector can be applied to any type of image.

In some embodiments, text block detection procedures may not be employed to detect the text blocks associated with activities that are part of a set of shapes contained within a particular diagram. In these embodiments, activity labels may not be detected in connection with dedicated text block detection mechanisms, as it is understood that an activity label is associated with the words located within the activity bounding box. Therefore, a pseudo text block may be created for each detected activity. In these embodiments, the pseudo text block receives the same bounding box as its associated activity shape but is not subjected to text block relation detection since its target shape is already known.

Given a particular text block, a text block handwriting recognition procedure may be employed to decode textual content within the text block for example by recognizing that the text block 104 contains the text "USER" 174 hand-drawn. Corresponding text block handwriting recognition may therefore be decomposed into two stages. First, in image word recognition, any kind of OCR service may be employed to recognize the words contained within an unstructured image. Each word may be defined by a bounding box, a rotation angle represented in degrees, and an associated word text. To accomplish this, any OCR service may be employed that supports handwritten text. Given a raw image as input, such an OCR service returns a set of text lines, where each line consists of a sequence of words. As words can be arbitrarily rotated, the word bounding boxes also indicate the angle. Since OCR services are commonly optimized towards handwritten documents, the returned text lines may combine lines corresponding to multiple text blocks e.g., when two text blocks are adjacent. Such an OCR service may recognize a text line such as "interview exper-tise," even though both words are supposed to belong to different text blocks. Therefore, in some embodiments, such text line information may be discarded, only keeping the returned words from the output of the OCR service. In the second stage of the text block handwriting recognition procedure, a textual content decoding procedure identifies the words that belong to each text block and combines the words into a word sequence that represents the textual content of the text block. In some embodiments, for each text block, a corresponding label is obtained by detecting the reading order of its contained words. Omitted in this procedure are notation words, which correspond to notational elements of the diagram language. In BPMN, for example, common notation words include recognized words for specific activity types, such as parallel task, which are marked with three consecutive vertical bars (e.g., "III"), or collapsed sub-processes, which are marked with a plus sign (e.g., "+"). As the specific type of activity is already detected by the object detector, the words that correspond to these markers can be simply removed.

Arrow 106 is identified as an arrow, an object of BPMN type "Sequence Flow", abbreviated as "SF", and detected to be object 136. Task box 138 is associated with detected arrow 144 of BPMN type "Message Flow", abbreviated as "MF," and label 142, which corresponds to label 112 is detected to be a text block as is label 140.

In some embodiments, a procedure is provided that decodes textual content associate with each text block. To this end, words are identified that belong to each text block, combining the words to obtain corresponding textual content. To identify the words that belong to a text block, the fraction to which each word is contained within a text block is computed. This fraction may be defined as the intersection area of the word bounding box and the text block bounding box divided by the area of the word bounding box. In these embodiments, each word is matched to the text block with the highest intersection, while only keeping words whose text block intersection exceeds a configurable threshold such as, for example 50%. Such a configurable threshold may be used to account for minor word and text block localization errors. Further, some OCR services may return false-positive words that are part of drawn shapes or edges. For example, a recognized "X" character may be mistaken for BPMN exclusive gateway symbols, or multiple returned hyphen or capital "I" characters for horizontal and vertical dashed arrows. These false positives may be discarded by only keeping words within text blocks. However, other false-positive words may also be located within text blocks that correspond to notational elements of BPMN.

In a subsequent stage, a reading order detection algorithm may decode textual content each text block. Given a set of words, the present teachings may employ a bounding box and rotation angle corresponding to each word to identify which words form a line, and in which order the lines should be read. A convention in BPMN is to only use rotated text for pool and lane labels, where the text is rotated by 90° counter-clockwise, i.e., the reading direction is bottom-totop. An exception to this convention is associated with collapsed pools, where a text block is commonly located in the center of the pool and not rotated. Generally speaking, textual content of text blocks may have three orientations: not rotated, 90° counterclockwise, and 90° clockwise. Accordingly, word detection mechanisms consistent with the present teachings considers that text is typically rotated by a multiple of 90°. Accordingly, word rotation angles may be discretized to a nearest of the three orientations.

Given a bounding box, orientation, and textual content of words associated with a text block, a word reading order process may operate as follows: First, a text block orientation may be defined as a most common orientation among all words assigned to a text block. Next, an average word height may be computed as the median word height of all words in the image that have the same orientation as the text block. Such averaging over all words in the image may reduce variance and may be thus more robust than only considering the text block words themselves. In order to separate words into lines, a word distance matrix may be computed, where each entry is defined as an absolute difference of y-center coordinates (x-center for rotated text blocks) of the bounding boxes of the corresponding words. In this way, two words may be considered to be on the same line if their distance is less than a configurable constant factor times the word height. Such a configurable constant factor may be 0.4, for example. Such a criterion may be used to obtain a binary matrix. Next, text block lines may be obtained by computing the connected components of the matrix. Finally, textual content of a detected line may be obtained by arranging the words according to their x-center coordinate (y-center for rotated text blocks).

In a next processing step, edge recognition is depicted in connection with detected BPMN pool 132 and other objects associated with hand-drawn BPMN pool 102. Detected arrow 154 is now a recognized edge within intermediate diagram 152 as is detected arrow 158. A recognized edge may be defined by a recognized arrow path and an identified source and target shape.

In a next processing step, label recognition is depicted in connection with detected BPMN pool 132 and other objects associated with hand-drawn BPMN pool 102. Detected label 174 contains recognized textual content corresponding to hand-drawn text block 104. As shown in connection with label relation indicator 176, detected label 174 corresponds to the detected BPMN pool shape that encloses the diagram. Similarly, detected task 178 contains detected text corresponding to the handwritten textual content corresponding to hand-drawn box 108 with the corresponding handwritten text "UPLOAD PHOTO," which is shown in capital letters to distinguish it from the handwritten content of hand-drawn box 108. Label 182 has corresponding detected text "OUT," which is also shown in capital letters to distinguish it from the handwritten content of handwritten label 112. As shown by label relation indicator 180, detected label 182 corresponds to detected arrow 158. Detected label 184 has a recognized textual content of "RECEIVE XML" and was determined to correspond to object 110. Mechanisms, for determining how labels correspond to objects are further described below in connection with FIGS. 3A and 3B. Finally, structured representation 190 is produced and output. In some embodiments, structured representation 190 may be an XML document containing BPMN content.

Figure 2:
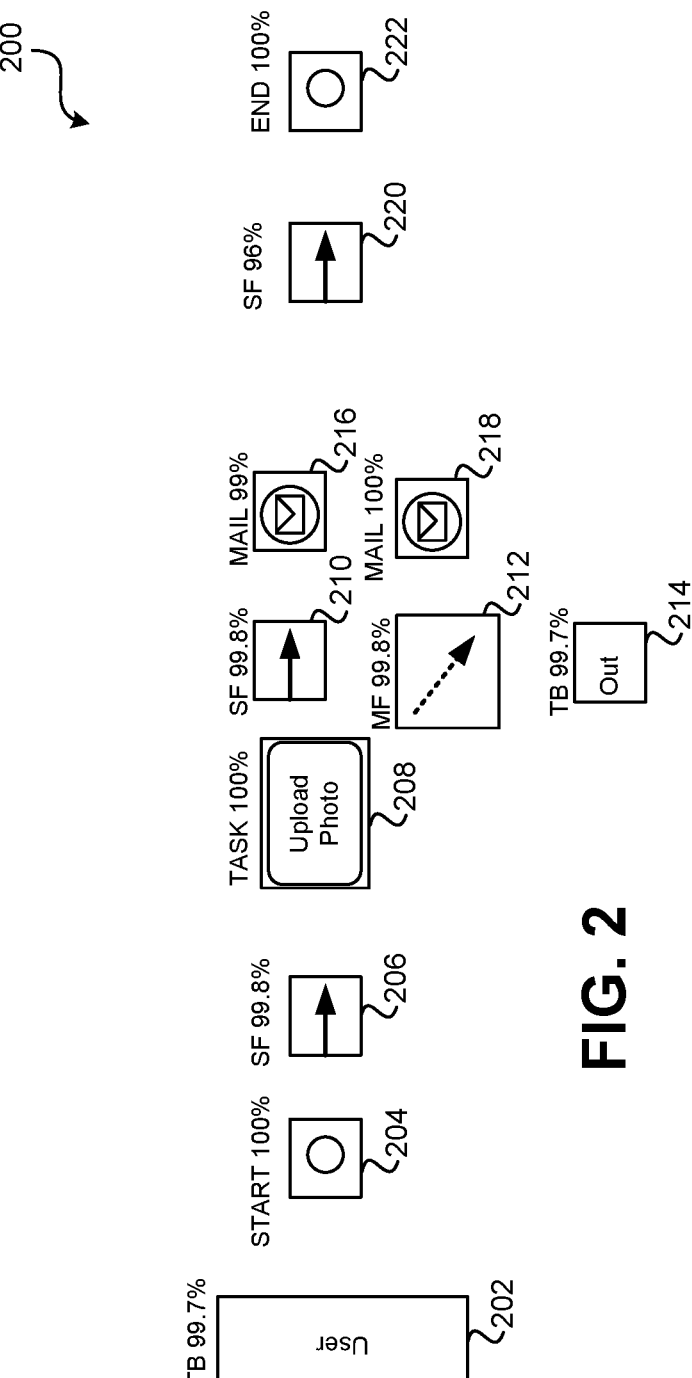
FIG. 2 is a diagram illustrating example object detection in a diagram derived from an unstructured image consistent with the present teachings.

FIG. 2 is a diagram 200 illustrating example object detection in a diagram derived from an unstructured image consistent with the present teachings. Handwritten object 202 is detected to be a text block (TB) with an estimated confidence level of 99.7. Object 204 is detected to be a start object with 100% certainty. Next, object 206 is detected to be an arrow of type sequence flow ("SF") with 99.8 percent certainty. Object 208 is detected to be a BPMN task with 100% certainty, where a task in BPMN is the standard activity type that does not have any additional markers as shown by rounded corners of the shape contained in the bounding box associated with object 208. Object 210 is detected to be an arrow of type sequence flow ("SF"), while Object 212 is detected to be an arrow of type message flow ("MF"). Object 214 is detected to be a text block with 99.7 percent certainty, where object 218 is detected to be a mail object. Object 220 is detected to be an arrow of type "SF," and object 222 is detected to be a stop object.

Figure 3A:
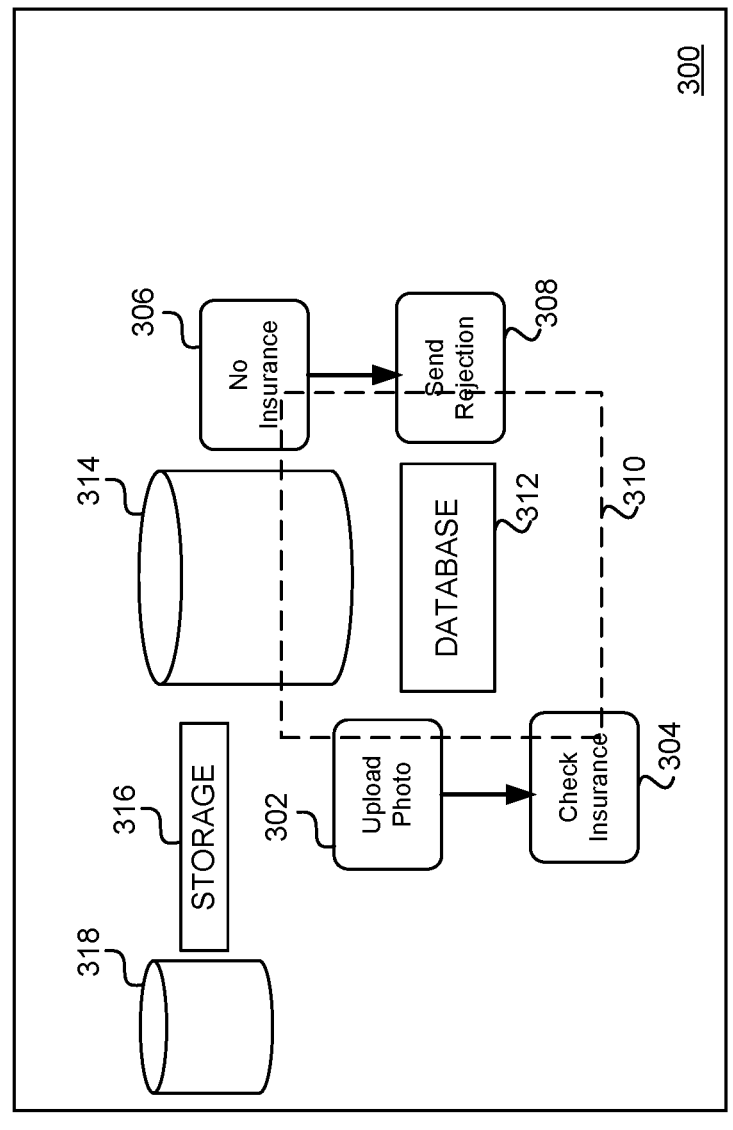
FIG. 3A shows an example portion of an unstructured image representing a portion of diagram to illustrate text block relation candidate generation consistent with the present teachings.

FIG. 3A shows an example portion 300 of an unstructured image representing a portion of diagram to illustrate text block relation candidate generation consistent with the present teachings. Text block relation detection may be characterized as a relationship detection problem that may be decomposed into several stages. First, relation candidate generation produces a set of shape and edge candidates for every text block in an image such as label 312, label 316, and BPMN tasks 302, 304, 306, and 308. Second, relation scoring predicts the score for each candidate pair, where a candidate pair consists of a text block and a related shape or edge. Next, the relation inference procedure tries to find the most likely shape or edge for each text block, and to eliminate duplicate labels, i.e., multiple text blocks that have been related to the same shape or edge.

Given a particular text block, a set of shapes and edges are identified that the text block might label. The set of candidates may be defined as all shape and edges that intersect with the so-called text block region 310. Text block region 310 may be identified by extending the text block bounding box by an estimated average text block size. A significant variance in text block bounding box sizes may be observed, since the textual content can range from single digit to multi-line text phrases. To compute the text block region, each text block is extended with the median size of all text blocks in a particular unstructured image. Here, the size of each text block may be defined as the mean of the text block's width and height. In order to reduce the number of false-positive candidates to evaluate, two patterns may be leveraged regarding the positions of text blocks relative to the shape or edge that they label. First, edge bounding boxes may not closely capture the drawn path of an arrow, especially for diagonal or elbow arrows. Therefore, an edge may be designated as a relation candidate if its drawn path, which may be identified by a sequence of keypoints, intersects the text block region. Second, in the context of BPMN, pool and lane labels are commonly located near a boundary of a detected shape. Accordingly, a pool or lane is typically only considered as relation candidate if the pool or lane intersects the (extended) text block region. In this way, creating a candidate for every text block that labels a shape or edge within the pool may be avoided. Here, label 312 is associated with object 314 rather than label 316 (which itself is associated with object 318). A determination of label association may be made as explained below in connection with FIG. 3B.

Figure 3B:
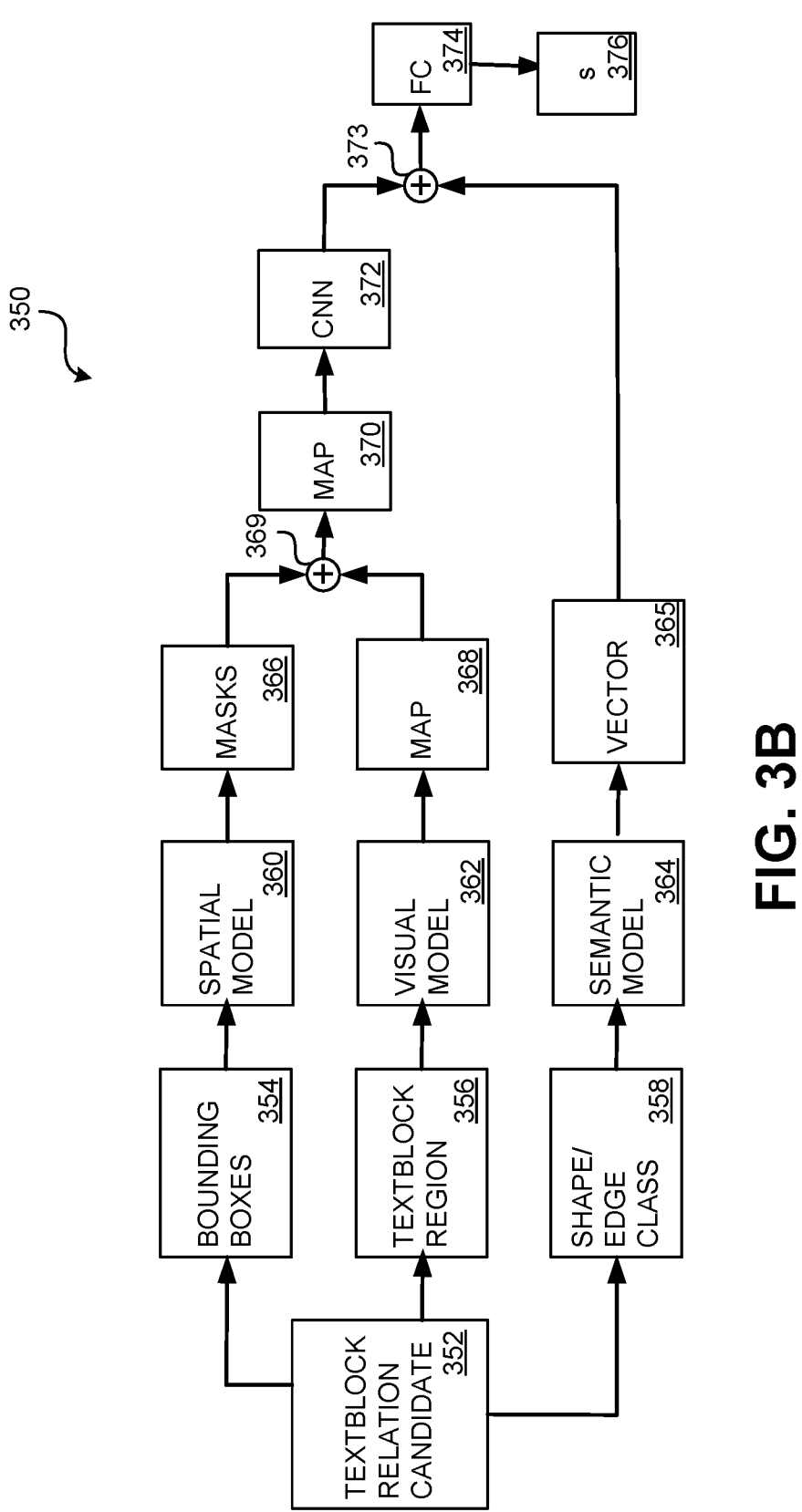
FIG. 3B shows an example network to illustrate text block relation scoring consistent with the present teachings.

FIG. 3B shows an example neural network 350 to illustrate text block relation scoring generation consistent with the present teachings. To perform text block relation scoring, a text block relation network may be used to determine the score of a relation candidate, i.e., the likelihood that text block labels a shape or edge. As shown in FIG. 3B, the network is provided text block relation candidate 352 as input, comprising bounding boxes 354 and associated class predictions 358 of the two objects, and text block region 356. As depicted, the text block relation scoring procedure uses three modules to analyze different kinds of features. A spatial module 360 encodes spatial features for each text block relation candidate, i.e., the (relative) locations of the bounding boxes of the text block and the associated shape or edge. For each predicted box of the two objects, the spatial module generates a binary mask that indicates the location of the box within the text block region, which leads to the two masks 366. Each binary mask may be initialized with zeros and then filled with ones for each bounding box pixel that is located within. The binary masks instruct the network which task it is supposed to solve, i.e., they indicate the text block and target shape or edge that the network should evaluate. However, in order to inspect the text block region, the network also needs the visual features of the region. These features may be generated in connection with visual module 362.

Visual module 362 may generate a learned visual feature representation of the text block region. These visual features can be used to assess the likelihood that a text block is the label of a particular shape or edge, e.g., by considering the distance between the hand-drawn strokes of both objects and other candidates in proximity. This visual feature representation can be learned through different ways. Deep learning object detectors, such as depicted in FIG. 1, have a built-in mechanism to obtain a feature representation of an arbitrary region within the image. This mechanism can be used to extract a fixed-size representation from a given bounding box. Using this mechanism, a visual feature representation with the same resolution as the binary masks may be generated. The visual feature representation and the binary masks of the spatial model may be concatenated in a combined representation, which is indicated by plus sign 369 in FIG. 3B. As discussed above, the network may use both spatial and visual features to solve the label recognition task. Given just the visual features, the network lacks information about the object pair it should evaluate. With both features, the network can learn to figure out which candidate shape or edge is most likely labeled by the text block. Both the spatial and visual module rely on the bounding boxes of the candidate objects, but do not consider the predicted shape or edge class. The next section therefore presents the semantic module, which leverages this information.

Semantic module 364 provides the network with an encoded representation of the predicted class of the target shape or edge of a relation pair. While not required, the network can use these features to learn class-specific modeling rules and conventions, e.g., by determining which shape or edge types are infrequently labeled. In some embodiments, predicted shape or edge classes may be converted into a vector 365 using a one-hot encoding (OHE) mechanism. In OHE, given N shape and edge classes, OHE produces a vector of size N, with N-1 0's and a single 1 at the index position that corresponds to the shape or edge class.

Visual and spatial features may be fused by concatenating the three binary masks as additional channels to the visual feature map 368 to obtain combined feature map 370. The fused visual and spatial features are processed by a convolutional neural network (CNN) 372 and projected to a vector of size 256. A CNN architecture may be used that includes six convolutional layers. Next, the three vectors may be concatenated via plus sign 373. The vector that fuses all three modules is processed by two fully-connected layers projected to a final feature vector 374. Finally, a binary classification layer with a sigmoid function predicts the text block relation score.

A relation inference procedure determines the final set of text block relations, and as part of this, also eliminates text blocks that have been identified as duplicates. For each text block, a relation candidate is chosen with the highest relation score. The relation and the object detector score may then be aggregated by taking their minimum, after which all text blocks whose aggregated score is lower than a configurable threshold such as 0.5 may be removed. Finally, text block duplicates are identified, i.e., multiple text blocks that have been matched to the same shape or edge, resolving such duplicate cases by keeping the text block having a highest score s 376.

Figure 4:
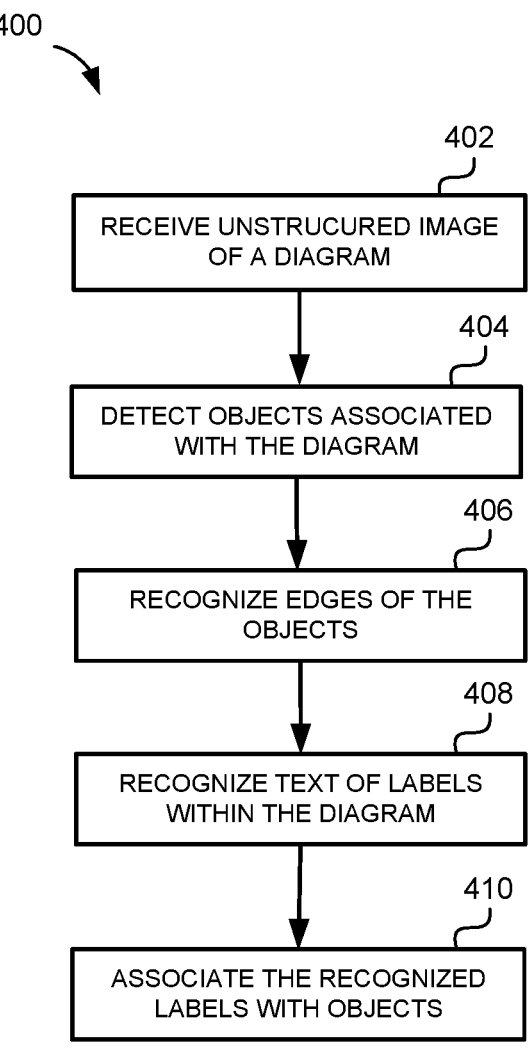
FIG. 4 is a flow diagram illustrating an example method for machine learning-based diagram label recognition in connection with diagrams represented by unstructured images according to certain embodiments.

FIG. 4 is a flow diagram 400 illustrating an example method for machine learning-based diagram label recognition in connection with diagrams represented by unstructured images according to certain embodiments. At step 402, the unstructured image of a diagram is received. At step 404, objects are detected that are associated with the diagram. The detected objects include one or more blocks of text. At step 406, the edges associated with detected arrow objects are recognized. In step 408, the textual contents associated with one or more blocks of text are recognized. Finally, in step 410, relationships between one or more blocks of text are recognized.

At step 406, edges contained within the diagram are recognized. At step 408, the textual content of each text block contained within the diagram is recognized. At step 410, the recognized labels are associated with corresponding objects contained within the diagram. In some embodiments, the unstructured image of the diagram is derived from a hand-drawn diagram. In some such embodiments detecting one or more blocks of text comprises differentiating activity bounding boxes associated with activity labels from blocks of text that are not associated with activity labels. The one or more blocks of text may be handwritten or otherwise generated, for example in connection with a diagram-generating software application. In some embodiments, the objects associated with the diagram include geometrical shapes and graphical depictions of diagram elements. In some embodiments, the method further comprises exporting the recognized diagram as a structured representation. The structured representation may be based on business process model and notation (BPMN).

Figure 5:
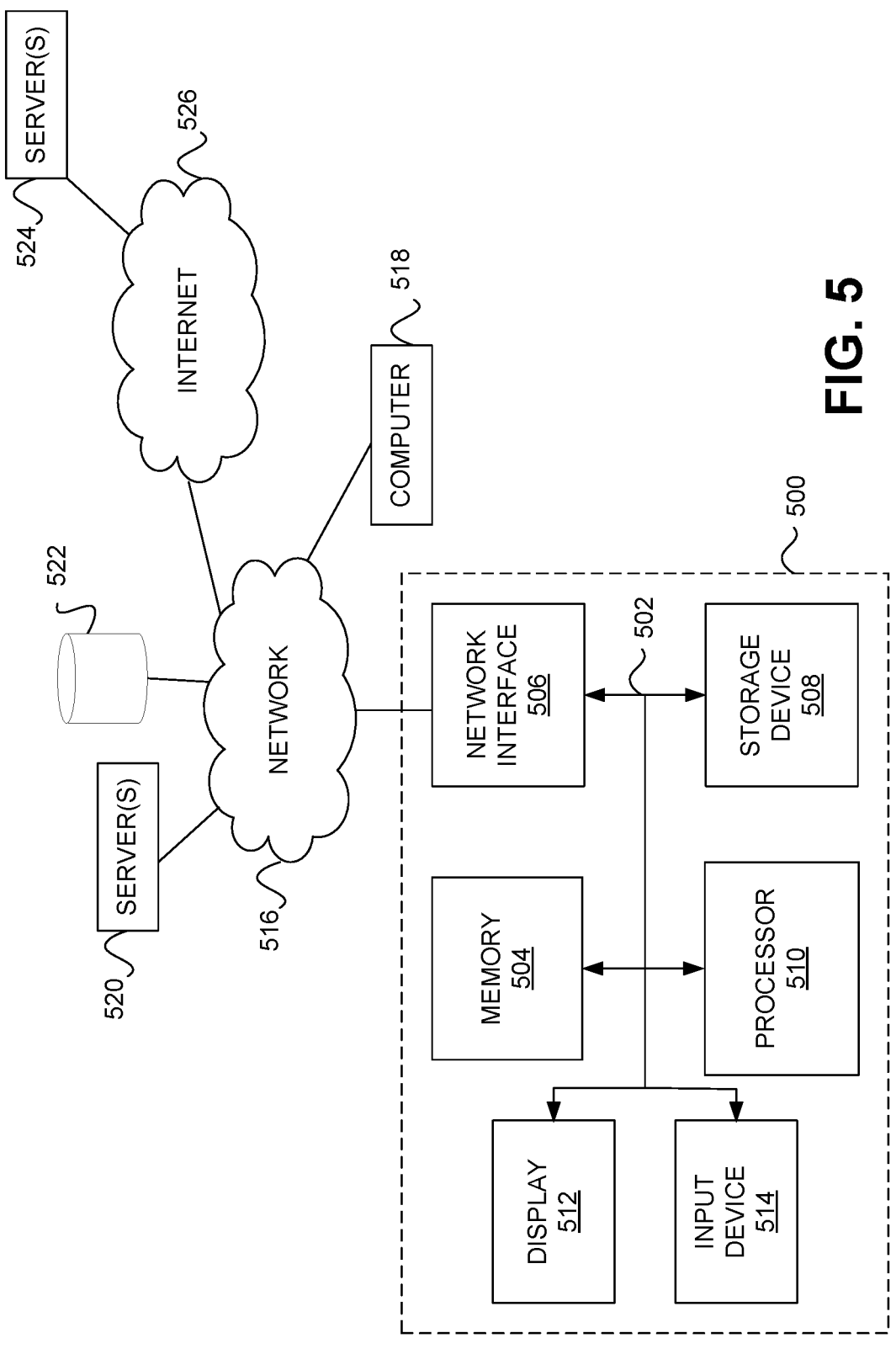
FIG. 5 is a diagram illustrating a sample computing device architecture for implementing various aspects described herein.

FIG. 5 is a diagram illustrating a sample computing device architecture for implementing various aspects described herein. Computer 500 can be a desktop computer, a laptop computer, a server computer, a mobile device such as a smartphone or tablet, or any other form factor of general- or special-purpose computing device containing at least one processor that may be employed to cause actions to be carried out. Depicted with computer 500 are several components, for illustrative purposes. Certain components may be arranged differently or be absent. Additional components may also be present. Included in computer 500 is system bus 502, via which other components of computer 500 can communicate with each other. In certain embodiments, there may be multiple busses or components may communicate with each other directly. Connected to system bus 502 is processor 510. Also attached to system bus 502 is memory 504. Also attached to system bus 502 is display 512. In some embodiments, a graphics card providing an input to display 512 may not be a physically separate card, but rather may be integrated into a motherboard or processor 510. The graphics card may have a separate graphics-processing unit (GPU), which can be used for graphics processing or for general purpose computing (GPGPU). The graphics card may contain GPU memory. In some embodiments no display is present, while in others it is integrated into computer 500. Similarly, peripherals such as input device 514 is connected to system bus 502. Like display 512, these peripherals may be integrated into computer 500 or absent. Also connected to system bus 502 is storage device 508, which may be any form of computer-readable media, such as non-transitory computer readable media, and may be internally installed in computer 500 or externally and removably attached.

Computer-readable media include both volatile and non-volatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-useable instructions, data structures, program modules, and other data representations.

Finally, network interface 506 is also attached to system bus 502 and allows computer 500 to communicate over a network such as network 516. Network interface 506 can be any form of network interface known in the art, such as Ethernet, ATM, fiber, Bluetooth, or Wi-Fi (i.e., the Institute of Electrical and Electronics Engineers (IEEE) 802.11 family of standards). Network interface 506 connects computer 500 to network 516, which may also include one or more other computers, such as computer 518, server(s) 520, and network storage, such as cloud network storage 522. Network 516 is in turn connected to public Internet 526, which connects many networks globally. In some embodiments, computer 500 can itself be directly connected to public Internet 526 as well as one or more server(s) 524.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system can include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "computer-readable medium" refers to any computer program product, apparatus and/or device, such as for example magnetic discs, optical disks, memory, and Programmable Logic Devices (PLDs), used to provide machine instructions and/or data to a programmable processor, including a computer-readable medium that receives machine instructions as a computer-readable signal. The term "computer-readable signal" refers to any signal used to provide machine instructions and/or data to a programmable processor. The computer-readable medium can store such machine instructions non-transitorily, such as for example as would a non-transient solid-state memory or a magnetic hard drive or any equivalent storage medium. The computer-readable medium can alternatively or additionally store such machine instructions in a transient manner, for example as would a processor cache or other random-access memory associated with one or more physical processor cores.

Many different arrangements of the various components depicted, as well as components not shown, are possible without departing from the scope of the claims below. Embodiments of the invention have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims. Although the invention has been described with reference to the embodiments illustrated in the attached drawing figures, it is noted that equivalents may be employed, and substitutions made herein without departing from the scope of the invention as recited in the claims. The subject matter of the present disclosure is described in detail below to meet statutory requirements; however, the description itself is not intended to limit the scope of claims. Rather, the claimed subject matter might be embodied in other ways to include different steps or combinations of steps similar to the ones described in this document, in conjunction with other present or future technologies. Minor variations from the description below will be understood by one skilled in the art and are intended to be captured within the scope of the present claims. Terms should not be interpreted as implying any particular ordering of various steps described unless the order of individual steps is explicitly described.

The following detailed description of embodiments references the accompanying drawings that illustrate specific embodiments in which the present teachings can be practiced. The described embodiments are intended to illustrate aspects of the disclosed invention in sufficient detail to enable those skilled in the art to practice the invention. Other embodiments can be utilized, and changes can be made without departing from the claimed scope of the invention. The following detailed description is, therefore, not to be taken in a limiting sense. The scope of embodiments is defined only by the appended claims, along with the full scope of equivalents to which such claims are entitled.

Having thus described various embodiments of the invention, what is claimed as new and desired to be protected by Letters Patent includes the following:

The invention claimed is:

1. A non-transitory computer-readable media storing computer-executable instructions that, when executed by a processor, perform a method for machine learning-based diagram label recognition of a graphical modeling language represented by a hand-drawn image of a diagram, the method comprising:

receiving the hand-drawn image of the diagram representing a graphical modeling language, the diagram comprising shapes, edges defined by an arrow that connects two shapes, and labels associating textual contents with a shape or an edge;

generating relation scores for a set of shape and edge candidate pairs for every text block that intersect within a text block region in the hand-drawn image, the candidate pairs comprising a text block and a related shape or edge, the generating relation scores comprising:

generating a binary mask that indicates a relative location of bounding boxes of the text block and the related shape or edge withing the text block region, the binary mask being initialized with zeros and then filled with ones for each bounding box pixel that is located within the text block region;

generating a learned visual feature representation of the text block region by assessing visual features of the text block using deep learning object detectors;

generating an encoded representation of a predicted class of a target shape or edge of a relation pair using class-specific modeling rules and conventions by determining which shape or edge types are infrequently labeled;

concatenating a combined representation of the binary mask, the learned visual feature representation, and the encoded representation of the predicted class; and processing the combined representation by a convolutional neural network with a binary classification layer using a sigmoid function to determine the relation scores;

identifying and removing duplicate text blocks that have been matched to a same shape or edge by keeping the text block having a highest relation score;

associating the labels with corresponding edges and shapes within the hand-drawn diagram using the relation scores; and exporting a structured representation of the diagram in a Business Process Model and Notation (BPMN)-compliant format, wherein the structured representation preserves the association between the labels and diagram elements.

2. A method for machine learning-based diagram label recognition of a graphical modeling language represented by a hand-drawn image of a diagram, the method comprising:

receiving the hand-drawn image of the diagram representing a graphical modeling language, the diagram comprising shapes, edges defined by an arrow that connects two shapes, and labels associating textual contents with a shape or an edge;

generating relation scores for a set of shape and edge candidate pairs for every text block that intersect within a text block region in the hand-drawn image, the candidate pairs comprising a text block and a related shape or edge, the generating relation scores comprising:

generating a binary mask that indicates a relative location of bounding boxes of the text block and the related shape or edge withing the text block region, the binary mask being initialized with zeros and then filled with ones for each bounding box pixel that is located within the text block region;

generating a learned visual feature representation of the text block region by assessing visual features of the text block using deep learning object detectors;

generating an encoded representation of a predicted class of a target shape or edge of a relation pair using class-specific modeling rules and conventions by determining which shape or edge types are infrequently labeled;

concatenating a combined representation of the binary mask, the learned visual feature representation, and the encoded representation of the predicted class; and processing the combined representation by a convolutional neural network with a binary classification layer using a sigmoid function to determine the relation scores;

identifying and removing duplicate text blocks that have been matched to a same shape or edge by keeping the text block having a highest relation score;

associating the labels with corresponding edges and shapes within the hand-drawn diagram using the relation scores; and exporting a structured representation of the diagram in a Business Process Model and Notation (BPMN)-compliant format, wherein the structured representation preserves the association between the labels and diagram elements.

3. A system for machine learning-based diagram label recognition of a graphical modeling language represented by a hand-drawn image of a diagram, the system comprising:

at least one processor;

and at least one non-transitory memory storing computer executable instructions that when executed by the at least one processor cause the system to carry out actions comprising:

receiving the hand-drawn image of the diagram representing a graphical modeling language, the diagram comprising shapes, edges defined by an arrow that connects two shapes, and labels associating textual contents with a shape or an edge;

associating the labels with corresponding edges and shapes within the hand-drawn diagram using the relation scores; and exporting a structured representation of the diagram in a Business Process Model and Notation (BPMN)-compliant format, wherein the structured representation preserves the association between the labels and diagram elements.

* * * * *